(12) United States Patent
Tsiberidis (10) Patent No.: US 11,413,914 B2
(45) Date of Patent: Aug. 16, 2022

(54) VEHICLE HAVING A COMPRESSOR ASSEMBLY

(71) Applicants: ILLINOIS TOOL WORKS INC., Glenview, IL (US); KT PROJEKTENTWICKLUNGS-GMBH, Heilbronn (DE)

(72) Inventor: Konstantin Tsiberidis, Untergruppenbach (DE)

(73) Assignee: ILLINOIS TOOL WORKS INC., Glenview, IL (US)

(*) Notice: Subject to any disclaimer, the term of this patent is extended or adjusted under 35 U.S.C. 154(b) by 402 days.

(21) Appl. No.: 16/462,873

(22) PCT Filed: Nov. 24, 2017

(86) PCT No.: PCT/EP2017/080393
§ 371 (c)(1),
(2) Date: May 21, 2019

(87) PCT Pub. No.: WO2018/096112
PCT Pub. Date: May 31, 2018

(65) Prior Publication Data
US 2020/0079158 A1 Mar. 12, 2020

(30) Foreign Application Priority Data
Nov. 24, 2016 (DE) .................... 10 2016 122 736.6

(51) Int. Cl.
*B60C 23/12* (2006.01)
*B60C 23/00* (2006.01)
(Continued)

(52) U.S. Cl.
CPC .......... *B60C 23/127* (2020.05); *B60C 23/004* (2013.01); *B60C 23/137* (2020.05);
(Continued)

(58) Field of Classification Search
CPC ..... B60C 23/004; B60C 23/12; B60C 23/127; B60C 23/16; B60S 5/046
See application file for complete search history.

(56) References Cited

U.S. PATENT DOCUMENTS 648,408 A 5/1900 Hayes
652,997 A 7/1900 Crandall
(Continued)

FOREIGN PATENT DOCUMENTS

CA 2226493 7/1996
CN 85105176 A 12/1986
(Continued)

OTHER PUBLICATIONS

European Patent Office (EPO), International Search Report, Form PCT/ISA/210 for International Application No. PCT/EP2017/080393 (2 pages).
(Continued)

*Primary Examiner* — Jason R Bellinger
(74) *Attorney, Agent, or Firm* — Pauley Erickson & Swanson (57) ABSTRACT

The invention relates to a vehicle with a compressor assembly for supplying pressure medium to a tire cavity of a tire of the vehicle wheel mounted on a wheel hub, wherein the wheel hub is mounted on a wheel carrier so as to be rotatable about an axis of rotation. The compressor assembly is located at or in the wheel hub mount.

11 Claims, 11 Drawing Sheets

(51) Int. Cl.
*B29L 30/00* (2006.01)
*B60B 9/18* (2006.01)
*B60C 23/16* (2006.01)
*B60C 29/06* (2006.01)
*B60S 5/04* (2006.01)
*F04B 53/16* (2006.01)

(52) U.S. Cl.
CPC ............ *B29L 2030/00* (2013.01); *B60B 9/18* (2013.01); *B60C 23/16* (2013.01); *B60C 29/062* (2013.01); *B60S 5/046* (2013.01); *F04B 53/162* (2013.01)

(56) References Cited

U.S. PATENT DOCUMENTS

| | | | |
|---|---|---|---|
| 655,797 | A | 8/1900 | Reason |
| 797,447 | A | 8/1905 | Merry |
| 1,358,524 | A | 11/1920 | Cooper |
| 1,713,899 | A | 5/1929 | Gray |
| 2,317,636 | A | 4/1943 | Parker |
| 2,506,677 | A | 5/1950 | McKenna |
| 5,052,456 | A | 10/1991 | Dosjoub |
| 5,325,902 | A * | 7/1994 | Loewe .................. B60C 23/004 152/418 |
| 5,505,080 | A * | 4/1996 | McGhee ............... B60C 23/004 116/34 R |
| 5,591,281 | A | 1/1997 | Loewe |
| 6,345,650 | B1 | 2/2002 | Paasch et al. |
| 6,736,170 | B2 | 5/2004 | Eriksen et al. |
| 6,994,136 | B2 | 2/2006 | Stanczak |
| 7,237,590 | B2 | 7/2007 | Loewe |
| 7,581,576 | B2 | 9/2009 | Nakano |
| 7,760,079 | B2 | 7/2010 | Isono |
| 7,891,393 | B1 | 2/2011 | Czarno |
| 8,052,400 | B2 * | 11/2011 | Isono ...................... F04B 35/00 417/233 |
| 9,151,288 | B2 | 10/2015 | Richardson et al. |
| 9,457,772 | B2 | 10/2016 | Paasch |
| 10,730,355 | B2 | 8/2020 | Grosse-Vehne et al. |
| 2003/0056851 | A1 | 3/2003 | Eriksen et al. |
| 2007/0151648 | A1* | 7/2007 | Loewe .................. B60C 23/004 152/419 |
| 2008/0060734 | A1 | 3/2008 | Stehle |
| 2010/0059143 | A1 | 3/2010 | Wang |
| 2010/0282388 | A1 | 11/2010 | Kelly |
| 2013/0251552 | A1 | 9/2013 | Richardson |
| 2013/0269514 | A1 | 10/2013 | Sato et al. |
| 2014/0096881 | A1* | 4/2014 | Loewe .................. B60C 23/12 152/415 |
| 2015/0101723 | A1 | 4/2015 | Keeney et al. |
| 2015/0191058 | A1 | 7/2015 | van Wyk Becker et al. |
| 2016/0107491 | A1 | 4/2016 | Lin |
| 2016/0250902 | A1 | 9/2016 | Becker |
| 2016/0288591 | A1 | 10/2016 | Becker |
| 2016/0288592 | A1 | 10/2016 | Becker |
| 2017/0072752 | A1 | 3/2017 | Lin |
| 2017/0113500 | A1 | 4/2017 | Gau et al. |
| 2019/0023091 | A1* | 1/2019 | Spindler ................. B60C 23/12 |
| 2019/0308472 | A1* | 10/2019 | Tsiberidis ............ B60C 23/137 |
| 2019/0366785 | A1* | 12/2019 | Tsiberidis ............. B60C 23/004 |
| 2020/0055351 | A1* | 2/2020 | Tsiberidis ............. B60C 23/004 |
| 2020/0070450 | A1* | 3/2020 | Tsiberidis ............. B60C 23/003 |

FOREIGN PATENT DOCUMENTS

| | | |
|---|---|---|
| CN | 86105562 A | 2/1988 |
| CN | 2126829 Y | 10/1993 |
| CN | 2188661 Y | 2/1995 |
| CN | 2202665 Y | 7/1995 |
| CN | 2252128 | 4/1997 |
| CN | 101104374 | 1/2008 |
| CN | 101120170 A | 2/2008 |
| CN | 201061989 Y | 5/2008 |
| CN | 201082666 | 7/2008 |
| CN | 101312821 A | 11/2008 |
| CN | 101313162 A | 11/2008 |
| CN | 101351347 A | 1/2009 |
| CN | 101696681 | 4/2010 |
| CN | 202439521 U | 9/2012 |
| CN | 102781653 A | 11/2012 |
| CN | 102791954 A | 11/2012 |
| CN | 103459843 A | 12/2013 |
| CN | 103465736 A | 12/2013 |
| CN | 104024007 A | 9/2014 |
| CN | 104583592 A | 4/2015 |
| CN | 105264228 A | 1/2016 |
| CN | 205044451 U | 2/2016 |
| CN | 105408135 A | 3/2016 |
| DE | 40 36 362 A1 | 5/1992 |
| DE | 41 33 039 A1 | 4/1993 |
| DE | 10 2005 019 766 A1 | 11/2006 |
| DE | 20 2014 010 520 U1 | 12/2015 |
| DE | 10 2015 115642 A1 | 3/2017 |
| EP | 0166123 | 1/1986 |
| EP | 0 588 595 A1 | 3/1994 |
| EP | 1 881 197 A1 | 1/2008 |
| EP | 2 828 103 B1 | 1/2015 |
| FR | 1324352 | 3/1963 |
| JP | H11139118 A | 5/1999 |
| JP | 2004-136797 | 5/2004 |
| JP | 2006-110762 | 4/2006 |
| JP | 2007-039013 A | 2/2007 |
| JP | 2007-278796 | 10/2007 |
| WO | WO 2008/041423 A1 | 4/2008 |
| WO | WO 2010/146373 A1 | 12/2010 |
| WO | WO 2014/009822 A1 | 1/2014 |
| WO | WO 2015/063679 A1 | 5/2015 |
| WO | WO 2015/075655 A1 | 5/2015 |
| WO | WO 2016/138972 A1 | 9/2016 |
| WO | WO 2016/178137 A1 | 11/2016 |
| WO | WO 2018/096108 A1 | 5/2018 |
| WO | WO 2018/096109 A1 | 5/2018 |
| WO | WO 2018/096110 A1 | 5/2018 |
| WO | WO 2018/096111 A1 | 5/2018 |

OTHER PUBLICATIONS

Chongfeng DI, "Research on Characteristic and Control Strategy of Hydraulic Hybrid Vehicle with Hydraulic Common Pressure Rail", China Master Dissertation Full-text Database, Jan. 1, 2016, pp. 27-38 and 78-80.

* cited by examiner

VEHICLE HAVING A COMPRESSOR ASSEMBLY

BACKGROUND OF THE INVENTION

Field of the Invention

The invention relates to a vehicle that has a compressor assembly.

The compressor assembly supplies a pressure medium to a tire cavity of vehicle tire, wherein the vehicle wheel comprises a wheel hub mount and is mounted on a wheel hub, wherein the wheel hub can rotate on a wheel mount about an axis of rotation.

Discussion of Related Art

In order to inflate a tire cavity of a vehicle tire with a pressure medium, such as compressed air, it is known to provide a tire valve on a vehicle wheel, via which the pressure medium can be introduced into the tire cavity. With vehicles such as passenger cars, trucks or utility vehicles, tire valves are normally located in the vicinity of a wheel rim on which the tire is mounted such that they are readily accessible from the outside.

An external pressure medium source can be connected to the tire valve by means of a hose in order to thus be able to control, and potentially correct, the tire pressure, in particularly manually.

A pressure medium source is understood to be a device that can pressurize and convey a pressure medium, as well as a reservoir for a pressure medium, thus a storage means for a pressurized pressure medium.

Vehicle-side pressure medium supply systems are also known that enable an autonomous inflation of the tire cavity in a vehicle tire with a pressure medium. For this, it is known to provide pressure medium lines to the wheels from a central pressure medium source on the vehicle, e.g. a compressor or a pressure accumulator, that lead into the tire cavity. In the transition from non-rotating components on the vehicle, e.g. the wheel mount, to the wheels that rotate when the vehicle is in operation, so-called rotary feedthroughs are implemented, which also enable an inflation with the pressure medium while driving, i.e. when the wheels are turning. In this manner, the tire pressure can be adjusted to changes in loads, driving surfaces, and ambient temperatures, or leakages can be compensated for, e.g. via diffusion.

The known systems have numerous problems. With external pressure medium sources, they must each be maintained, and the pressure in all of the tire cavities must be checked extensively. With the known vehicle-side pressure medium sources, which supply the pressure medium to the tire cavities via rotary feedthroughs, the operational reliability of the rotary feedthroughs for the pressure medium poses a problem. The rotary feedthroughs can only be made robust and durable with a great deal of effort, such that they last as long as a vehicle, which turns out to be expensive and uneconomical.

SUMMARY OF THE INVENTION

The object of the present invention is to create a vehicle that has a compressor assembly that reliably and with little maintenance ensures an inflation of the tire cavity with a pressure medium over the entire service life of the vehicle. The compressor assembly preferably functions automatically.

"Automatically" means that it is not necessary to stop and use an external pressure medium source.

The operation of the compressor assembly according to the invention can be initiated autonomously, however, i.e. via an arbitrary regulator or control assembly in the vehicle, or in response to a control signal by a vehicle driver.

This object is achieved by a vehicle that has a compressor assembly. The vehicle according to the invention is distinguished in that the compressor assembly is located in the vicinity of the wheel mount, preferably in the wheel mount.

As a result, the compressor assembly can be located on the hub, such that it rotates conjointly with the hub-side components, thus the components that rotate in relation to the passenger compartment. In other words, the compressor assembly rotates with the vehicle wheel when the vehicle is in operation. As a result of the hub-side location of the compressor assembly, a pressurized pressure medium can be supplied directly to the rotating vehicle wheel. A rotary feedthrough for the pressure medium is therefore unnecessary. In other words, the pressure medium is available directly at the location where it is needed, i.e. the rotating tire cavity.

It is preferred when a compression chamber of the compressor assembly, i.e. a chamber in which the pressure medium is pressurized, is located on the hub and is thus always connected for conjoint rotation with the hub-side components, which rotate when the vehicle is in operation.

As stated above, rotary feedthroughs for a pressure medium are difficult to design and it is difficult to make them reliable and functional in a durable manner. It is also difficult to create such pressure medium rotary feedthroughs due to the adverse conditions in the vicinity of the vehicle wheel, because this area is prone to contaminants and impact-related loads. The vehicle according to the invention thus allows for a compressor assembly to be installed that requires little maintenance and is operationally reliable, with which a pressure medium is always available with sufficient pressure when needed, thus ensuring that the tire can always be sufficiently inflated. As a result, the vehicle is safer on the whole.

It is advantageous, in particular, when the compressor assembly comprises at least one compression chamber that rotates conjointly with the wheel hub. Because the pressure chamber rotates conjointly with the wheel hub, the pressure medium provided by the compression chamber can be supplied to the tire cavity via a rigid line.

The term compression chamber as set forth in the present application, is to be understood in the broadest sense. Any chamber in which a pressure medium can be compressed, i.e. pressurized, falls under this term.

It is particularly preferred that the volume of the compression chamber can preferably be altered by a movement, in particular a translatory movement, of a hub-side compressor component, wherein, when the volume of the compression chamber is reduced, a pressure medium that is to be conducted into the tire cavity is pressurized. Such a compressor assembly basically functions as a piston pump, and is particularly compact and efficient.

It is advantageous when the compressor assembly comprises an electric drive. This allows the compressor assembly to also be operated when the vehicle is not running.

It is also advantageous when the compressor component executes an oscillating translatory movement in the direction of the axis of rotation when the compressor assembly is in operation. The embodiment with a compressor component that moves in an oscillating translatory manner has the advantage that no radial forces occur that lead to imbalances when the vehicle wheel is rotating. One embodiment is characterized in that the compressor component executes an oscillating translatory movement in the radial direction when the compressor assembly is in operation. This results in a particularly high delivery rate of the compressor assembly, and a particularly constant delivery rate can be obtained when numerous compressor components are used.

The compressor assembly advantageously comprises a transmission assembly for converting a rotating movement of a drive-side transmission component of the, preferably electric, drive into a translatory movement of the compressor component. A rotating movement can be obtained particularly easily via an electric drive. Furthermore, a translatory movement of the compressor component is a particularly efficient and reliable means for conveying a pressure medium.

It is also advantageous when the transmission assembly comprises a cam mechanism. As a result, a relative movement between a drive-side transmission component and the other components of the compressor assembly can be efficiently converted into a translatory movement of the compressor component.

It is also advantageous when the electric drive is supplied with power via an on-board power source, in particular the main battery for the vehicle, and there are sliding contacts for supplying the electric energy from the wheel mount side to the hub side. This has the advantage that no additional power sources or a power storage unit are needed for the compressor assembly, and instead, the electric energy of the on-board power source can be used for operating the assembly. It is also advantageous when there is an electric energy source, in particular a power storage unit, preferably a rechargeable battery, on the hub side. As a result, the main battery of the vehicle is unburdened, and it is also possible to operate the compressor assembly when the vehicle is stationary, or when the on-board power source is exhausted.

In a preferred embodiment, a generator is provided on the hub side, which converts the relative rotational movement between hub-side and wheel mount-side components into electric energy for driving the compressor assembly. When the vehicle is in operation, there is necessarily a relative movement between hub-side and wheel mount-side components. This relative rotational movement can then be used as needed for supplying power to the compressor assembly.

One advantageous embodiment is characterized in that it comprises a coupling mechanism for coupling and decoupling a hub-side transmission component with a drive-side transmission component. As a result, the compressor assembly can be switched easily from a functional operating state to a freewheeling operating state.

Another preferred embodiment is characterized in that there is a mechanism for a contactless transfer of energy from a wheel mount-side energy source to the hub side, in particular the compressor assembly. This prevents wear when supplying energy to the compressor assembly.

It is advantageous when the compressor assembly is connected to a filter at the pressure medium intake side. This prevents clogging in the compressor assembly.

It is advantageous when the compressor assembly is designed to use the pressure medium from the tire cavity, or by conveying the pressure medium through the compressor assembly, to clean the filter. As a result, the compressor assembly is self-maintaining.

In another embodiment, electric energy for operating the compressor assembly is transferred from a main battery of the vehicle via symbolically illustrated sliding contacts from the wheel mount side to the hub side.

In another embodiment, electric energy for operating the compressor assembly is provided directly at the hub side via a power generator, which is preferably at least partially located at the hub side. The energy generator is preferably generator. The energy generator exploits the relative rotational movement between the wheel mount side and the hub side to generate a current.

In another embodiment, electric energy for operating the compressor assembly is transferred from the main battery of the vehicle via a symbolically illustrated, contactless, preferably inductive, transmission mechanism, from the wheel mount side to the hub side.

In another embodiment, electric energy for operating the compressor assembly is supplied directly at the hub side via an energy storage unit, preferably in the form of a rechargeable battery. The combination of the energy storage unit with the energy generator is preferred. The energy generator is preferably a generator. The energy generator exploits the relative rotational movement between the wheel mount side and the hub side for generating a current.

The compressor assembly preferably initiates is operation autonomously, when a tire pressure falls below a tire pressure threshold value.

The compressor assembly preferably initiates its operation autonomously when a tire pressure exceeds a tire pressure target value. The compressor assembly can also be controlled by the driver of the vehicle, i.e. the operation thereof can be initiated and adjusted in response to a control signal by the driver, and it is advantageous when the driver can define, or defines, target values for the tire pressure threshold value and/or the tire pressure target value.

BRIEF DESCRIPTION OF SEVERAL VIEWS OF THE DRAWINGS

Further features, application possibilities and advantages of the invention can be derived from the following description of exemplary embodiments of the invention, which shall be explained in reference to the drawings, wherein the features may be substantial to the invention in and of themselves as well as in different combinations, without this necessarily being indicated explicitly.

DETAILED DESCRIPTION OF THE INVENTION

Corresponding components and elements have the same reference symbols in the figures. For purposes of clarity, not all of the figures have all of the reference symbols.

Figure 1:
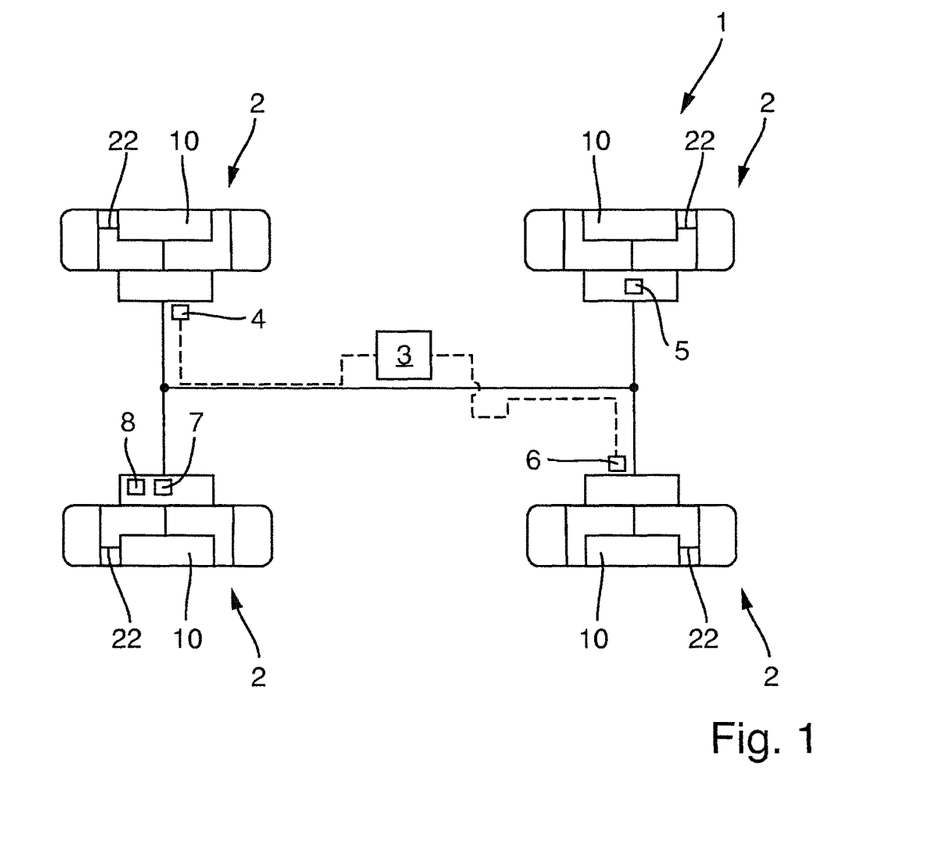
FIG. 1 shows a schematic illustration of a vehicle with compressor assemblies, according to one embodiment of this invention.

FIG. 1 shows a schematically illustrated vehicle 1 according to the invention. The vehicle has four vehicle wheels 2 in the present embodiment, wherein the present invention is not limited to four-wheeled vehicles 1. Each of the vehicle wheels 2 has a dedicated compressor assembly 10, schematically shown in FIG. 1.

With a vehicle wheel 2, electric energy for operating the compressor assembly 10 is supplied by a main battery 3 of the vehicle via symbolically illustrated sliding contacts 4 from the wheel mount side to the hub side.

In another vehicle wheel 2, electric energy for operating the compressor assembly 10 is provided directly at the hub side via an energy generator 5, which is preferably at least partially located at the hub side. The energy generator 5 is preferably a generator. The energy generator 5 exploits the relative rotational movement between the wheel mount side and the hub side to generate a current.

In another vehicle wheel 2, electric energy for operating the compressor assembly 10 is transferred from the main battery 3 of the vehicle from the wheel mount side to the hub side via a symbolically illustrated, contactless, preferably inductive, transmission mechanism 6.

In another vehicle wheel 2, electric energy for operating the compressor assembly 10 is provided directly at the hub side via an energy storage unit 7, preferably in the form of a rechargeable battery. The combination of the energy storage unit 7 with an energy generator 8 is preferred. The energy generator 5 is preferably a generator. The energy generator 5 exploits the relative rotational movement between the wheel mount side and the hub side for generating a current.

Figure 2:
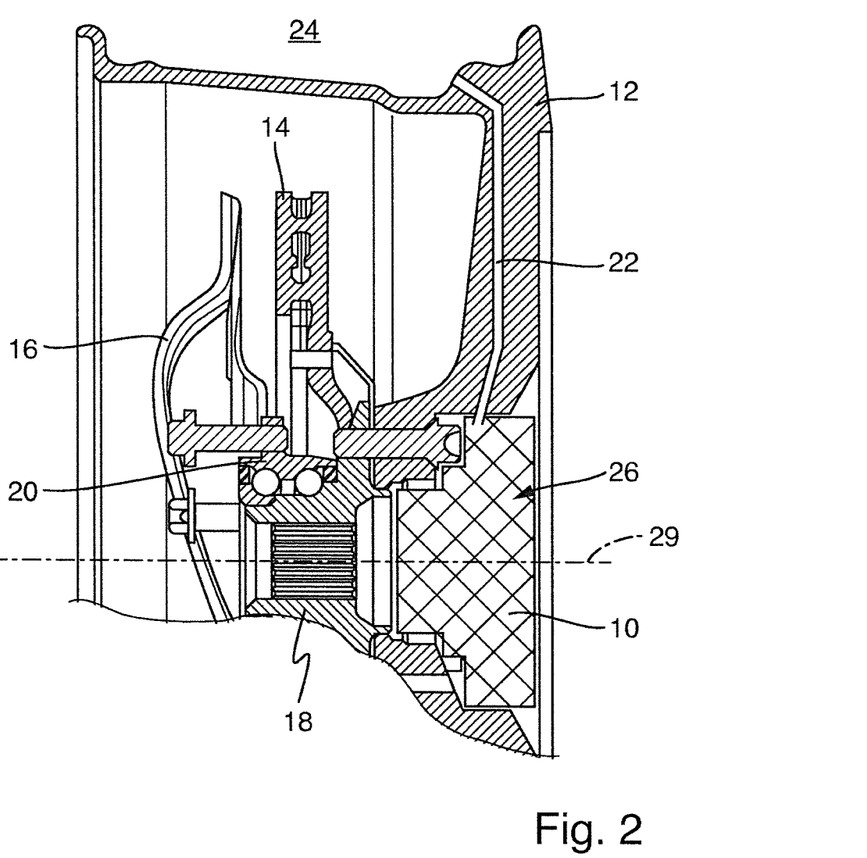
FIG. 2 shows an installation position of a compressor assembly according to one embodiment of this invention.

The location of the compressor assembly 10 in the individual vehicle wheels 2 is schematically illustrated in FIG. 2 in reference to one of the vehicle wheels 2. Regarding its location, the compressor assembly is indicated by a cross-hatched region with the reference symbol 10.

A wheel rim is indicated by the reference symbol 12. A brake disk has the reference symbol 14, a wheel mount has the reference symbol 16, a wheel hub has the reference symbol 18, and a wheel bearing has the reference symbol 20.

A pressure medium line 22 extends from the compressor assembly 10 to the tire cavity 24. The tire itself is not shown in FIG. 2.

The compressor assembly 10 is located according to the invention, as shown in FIG. 2, in the vicinity, in particular in, the wheel hub mount 26. A pressurized pressure medium is conveyed from the compressor assembly 10 into the tire cavity 24 via the pressure medium line 22.

In the embodiment shown in FIG. 2, the pressure medium line 22 extends through the material of the wheel rim 12. The hub-side components of the vehicle wheel 2 can rotate in relation to the wheel mount 18 about the axis of rotation 29 via the wheel bearing 20.

Figure 3:
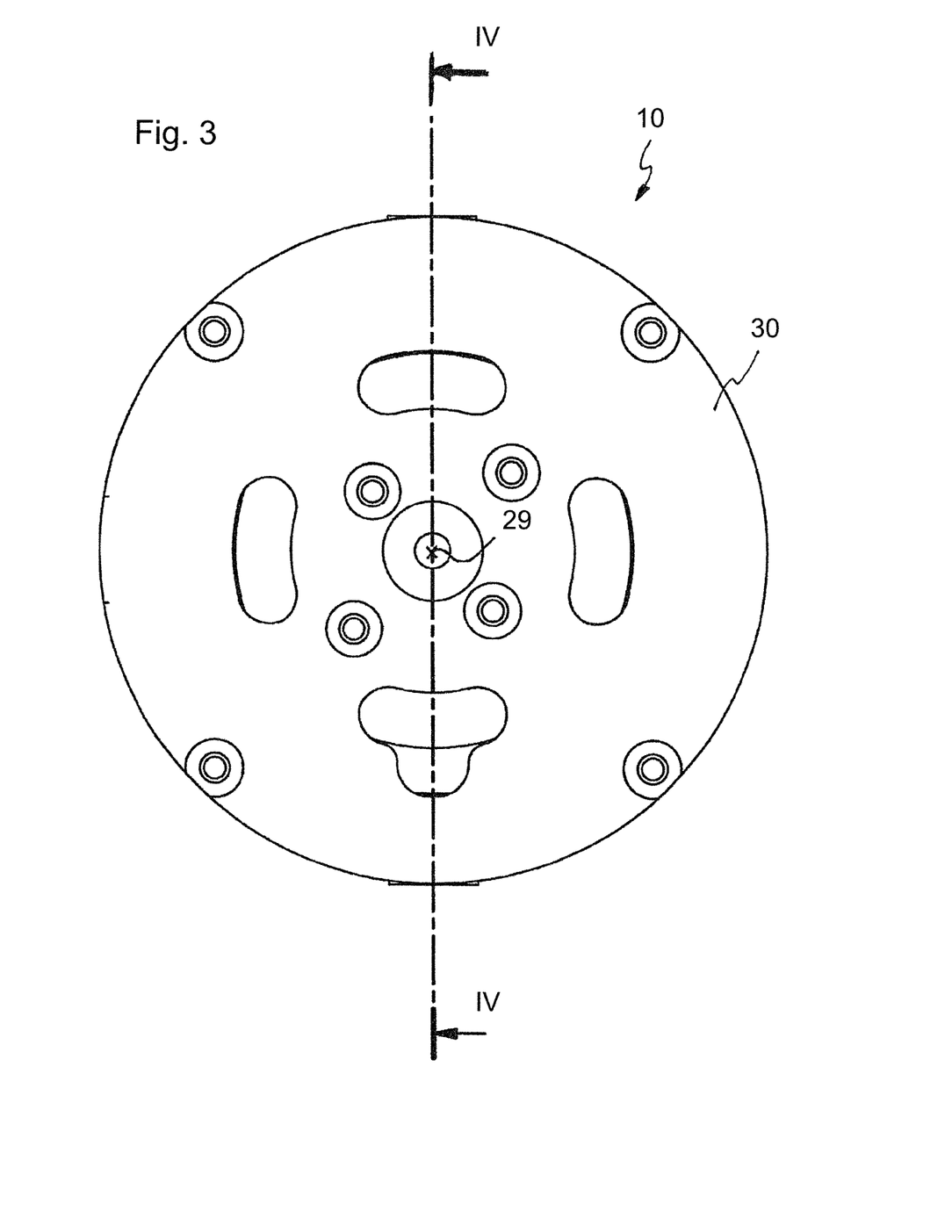
FIG. 3 is a compressor assembly according to one embodiment of this invention.

FIG. 3 shows a first embodiment of a compressor assembly 10 according to the invention in detail, in a side view. The compressor assembly 10 comprises a first hub-side housing component 30 and a second hub-side housing component 32, which are connected to one another for conjoint rotation.

Figure 4:
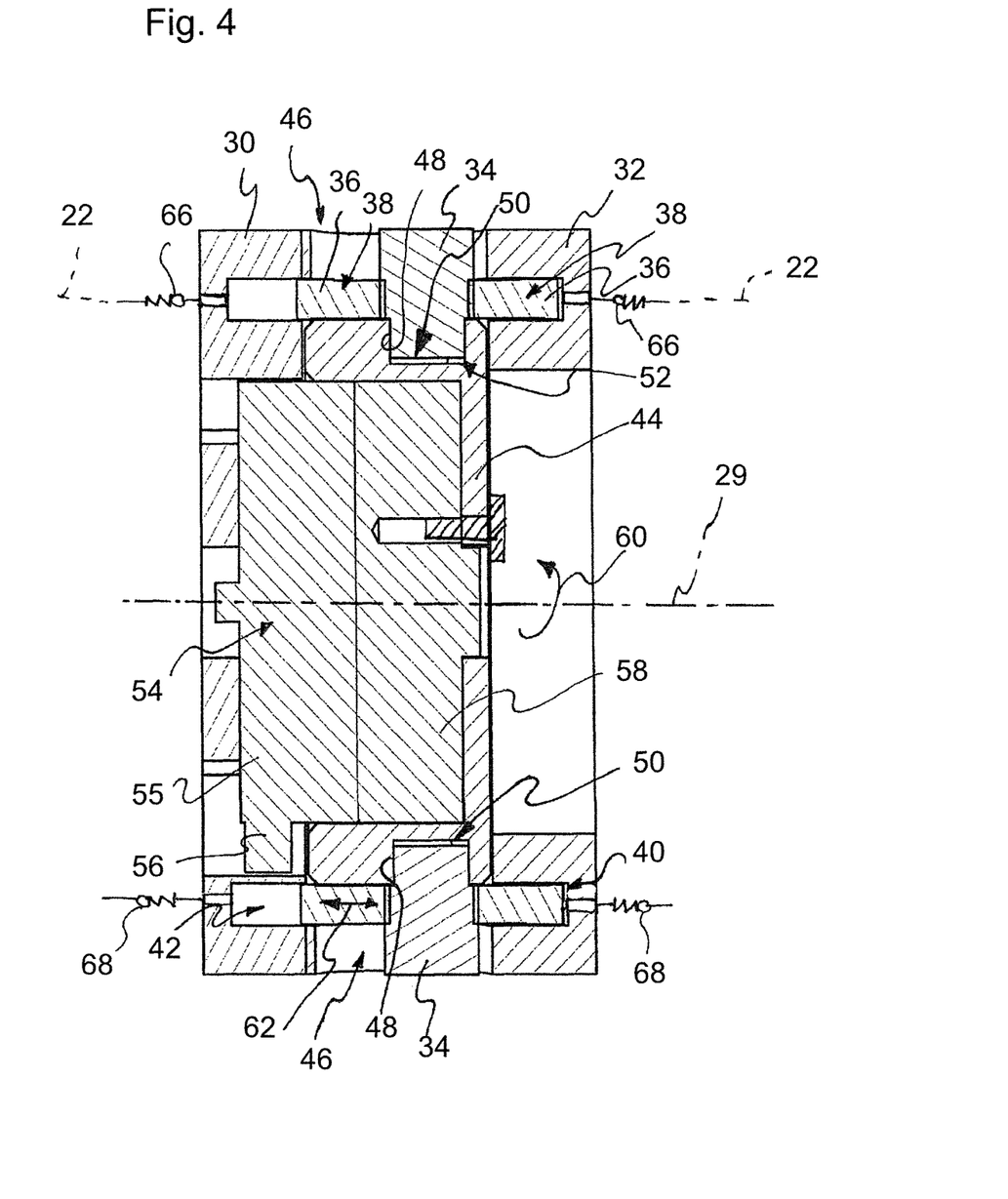
FIG. 4 is a sectional view of the compressor assembly of FIG. 3.

The compressor assembly from FIG. 3 is shown in FIG. 4, cut along the line IV-IV when viewed in the direction of the corresponding arrow.

A hub-side transmission component has the reference symbol 34. It can be seen in FIG. 3 that the compressor assembly 10 has numerous hub-side transmission components 34. An annular piston 36 is connected to the hub-side transmission components 34, which forms a compressor component 38.

The annular piston 36 is in the form of a double piston, and borders on a first compression chamber 40 and a second compression chamber 42. The first compression chamber 40 and the second compression chamber 42 are each in the form of an annular chamber.

The hub-side transmission elements 34 are engaged with a drive-side transmission component 44 such that they can interact therewith. The hub-side transmission elements 34 collectively form a transmission assembly 45 with the drive-side transmission component 44. The hub-side transmission components 34 are supported in the second hub-side housing component 32 in slot-like recesses 46. Because they are supported in the slot-like recesses 46, the hub-side transmission components 34 can only move in a translatory manner along the direction of the axis of rotation 29 in relation to the second hub-side housing component 32, but they cannot rotate in relation to the second hub-side housing component 32 and the compressor component 38.

The hub-side transmission components 34 are engaged with the drive-side transmission component 44, as stated above. The engagement sections 48 of the respective hub-side transmission components 34 engage in a cam track 50 on the drive-side transmission component 44. The cam track 50 is an embodiment of a cylindrical cam 52.

An electric drive 54 is located inside the hub-side housing components 30 and 32. The electric drive 54 is connected at a first section 55 to the first hub-side housing component 30 for conjoint rotation therewith, via a pin 56, and thereby indirectly connected to the second hub-side housing component 32. A second section 58 of the electric drive 54 can rotate in relation to the first section 55, and is connected to the drive-side transmission component 44 for conjoint rotation therewith.

Figure 5:
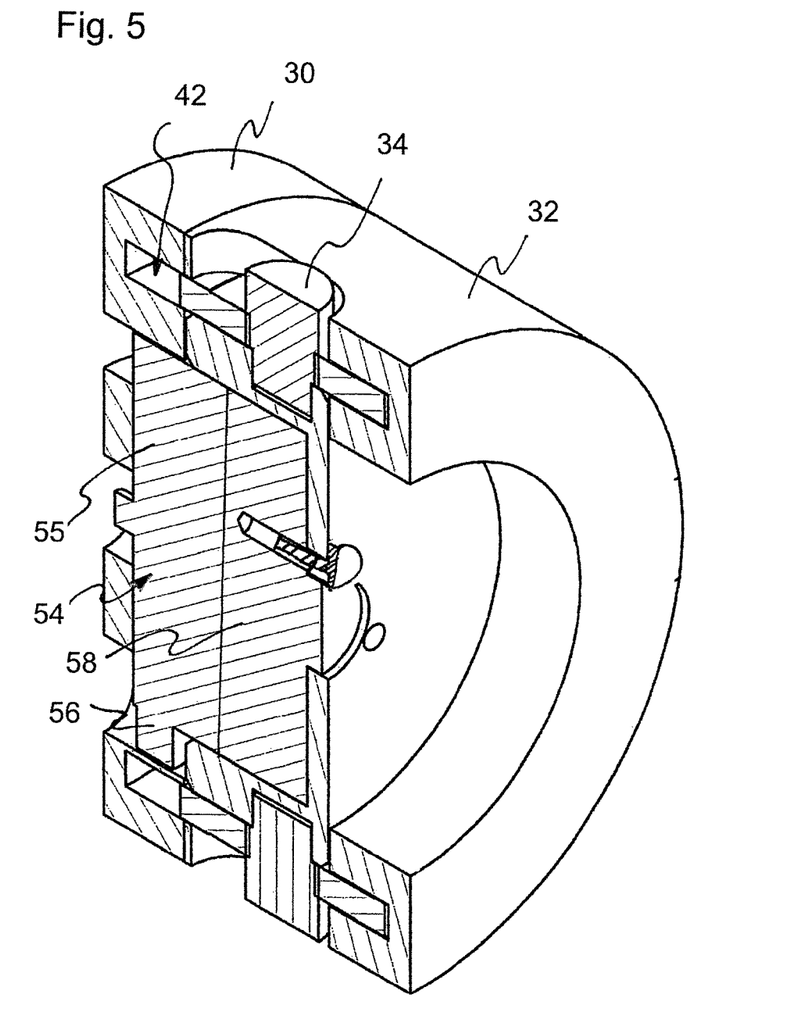
FIG. 5 is a perspective sectional of the compressor assembly of FIG. 3.
Figure 6:
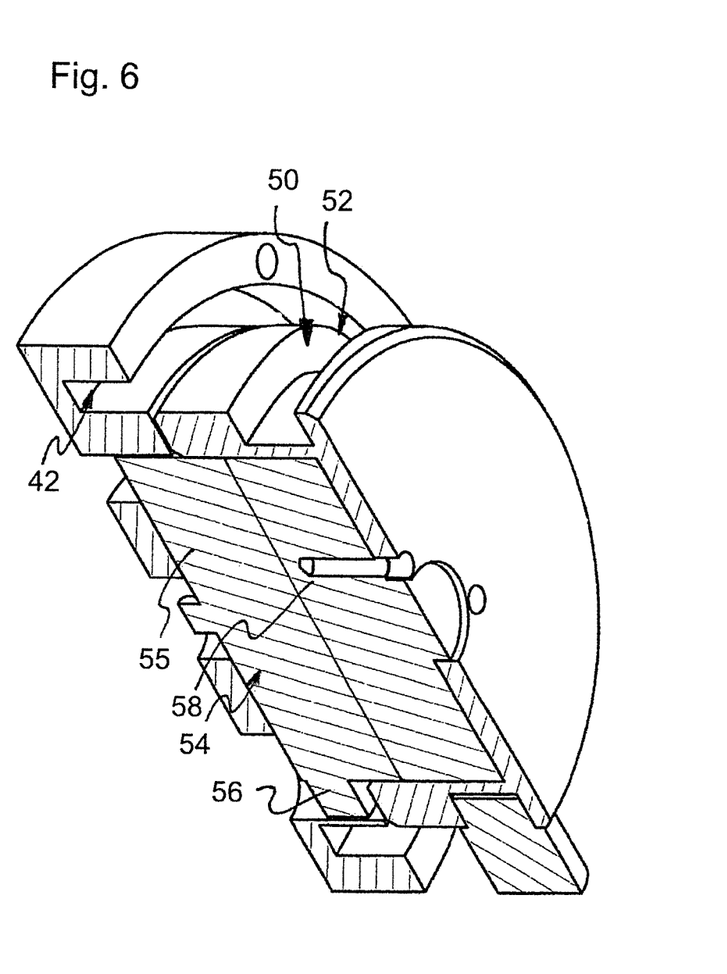
FIG. 6 is a perspective sectional of the compressor assembly of FIG. 3.
Figure 7:
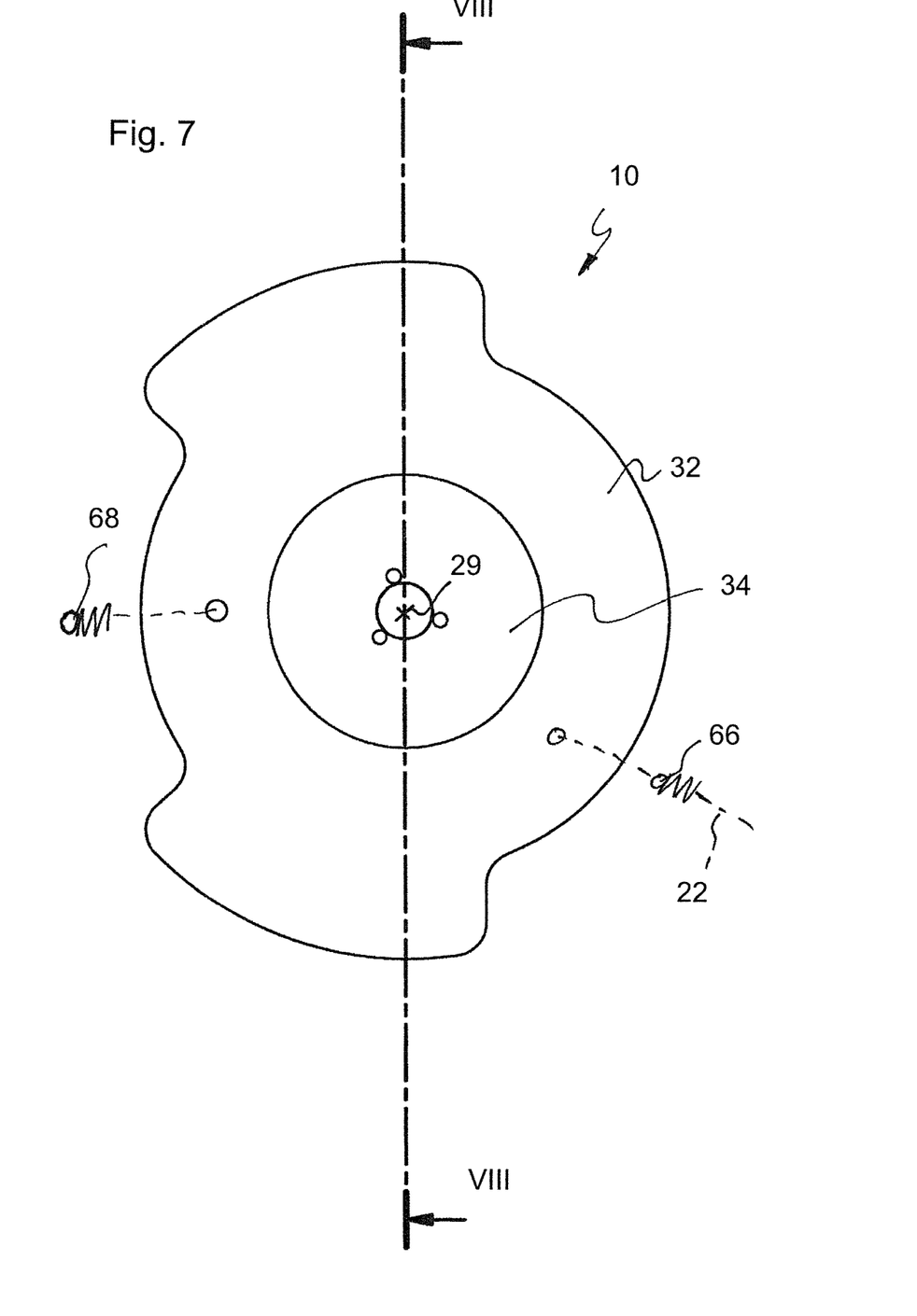
FIG. 7 is a compressor assembly according to one embodiment of this invention.

The compressor assembly 10 from FIGS. 2 and 3 is shown in FIG. 4 in a perspective and cutaway illustration. The compressor assembly 10 is shown in FIG. 5 in a perspective similar to that in FIG. 4, wherein only one of the hub-side transmission components 34 is shown. The annular piston 36, the second hub-side transmission component 34, and the first hub-side housing component 30 are not shown. In FIG. 5, the curve of the cam track 50 can be clearly seen, in particular.

When the compressor assembly 10 is in operation, the second section 58 of the electric drive 54 rotates in relation to the first section 55. As a result, the drive-side transmission component 44 is offset to the hub-side housing components 30 and 32, as well as the hub-side transmission components 34, in a rotation indicated by the arrow 60 in FIG. 4.

The hub-side transmission components 34 are engaged with a drive-side transmission component 44 such that they can interact therewith. The aforementioned relative rotational movement 60 is converted through this interaction into an oscillating translatory movement 62 of the hub-side transmission components 34, and thus the compressor component 38, i.e. the annular piston 36. The volumes of the first compression chamber 40 and the second compression chamber 42 are reduced and increased in an alternating manner by the oscillating translatory movement, by means of which the pressure medium in the compression chambers 40, 42, which in the present case is air, is compressed, thus pressurized and conveyed. The air, i.e. the pressure medium, is conveyed in a respective conveyance stroke of the annular piston 36 into the tire cavity 24 via a non-return valve 66 that opens toward the tire cavity 24, via the pressure medium line 22. In a respective suctioning stroke of the annular piston 66, non-return valves 68 that open into the respective compression chambers 40, 42 open, and air can flow into the compression chambers 40, and 42.

FIGS. 7 to 10 show an alternative embodiment of a compressor assembly 10 according to the invention.

The embodiment according to FIGS. 7 to 10 differs from the preceding embodiment shown in FIGS. 3 to 6 in that the hub-side transmission components 34 can be coupled to the drive-side transmission component 44. The hub-side transmission components 34 thus form part of a coupling mechanism 70. In order to couple the hub-side transmission components 34 to the drive-side transmission component 44, a transmission component-side pressure medium chamber 72 is subjected to the pressure medium, resulting in a movement of the hub-side transmission components 34 toward the drive-side transmission component 44.

Figure 8:
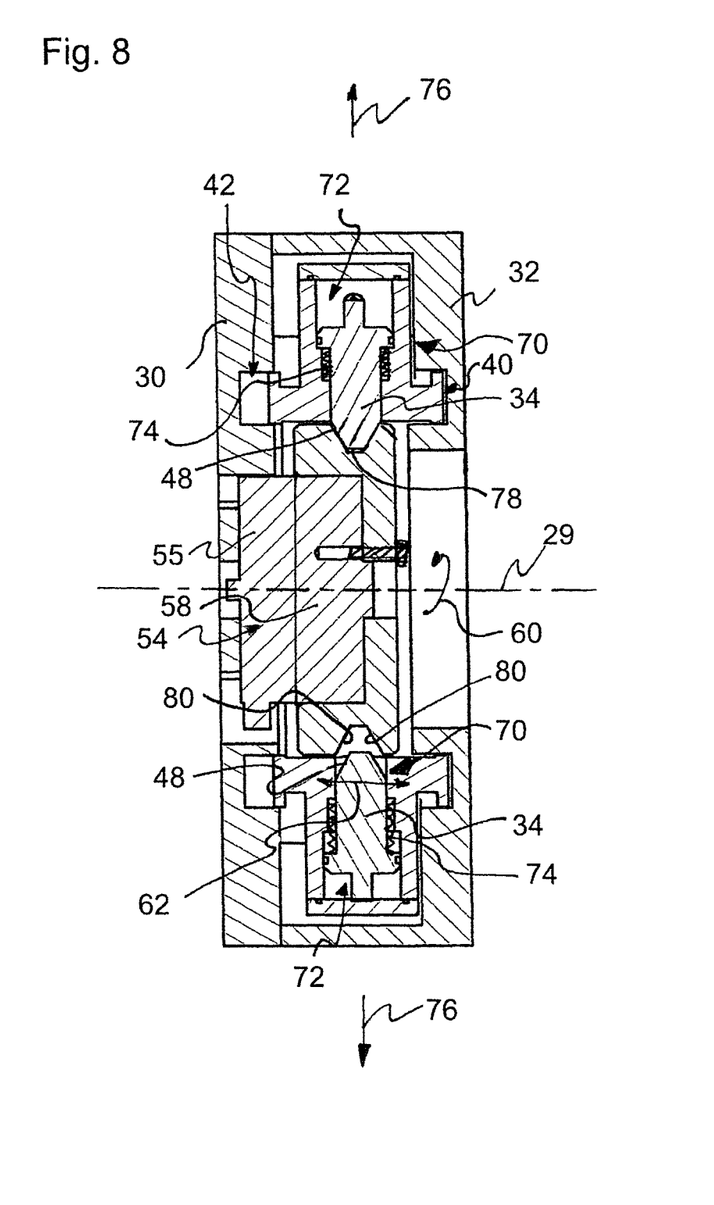
FIG. 8 is a sectional view of the compressor assembly of FIG. 7.
Figure 9:
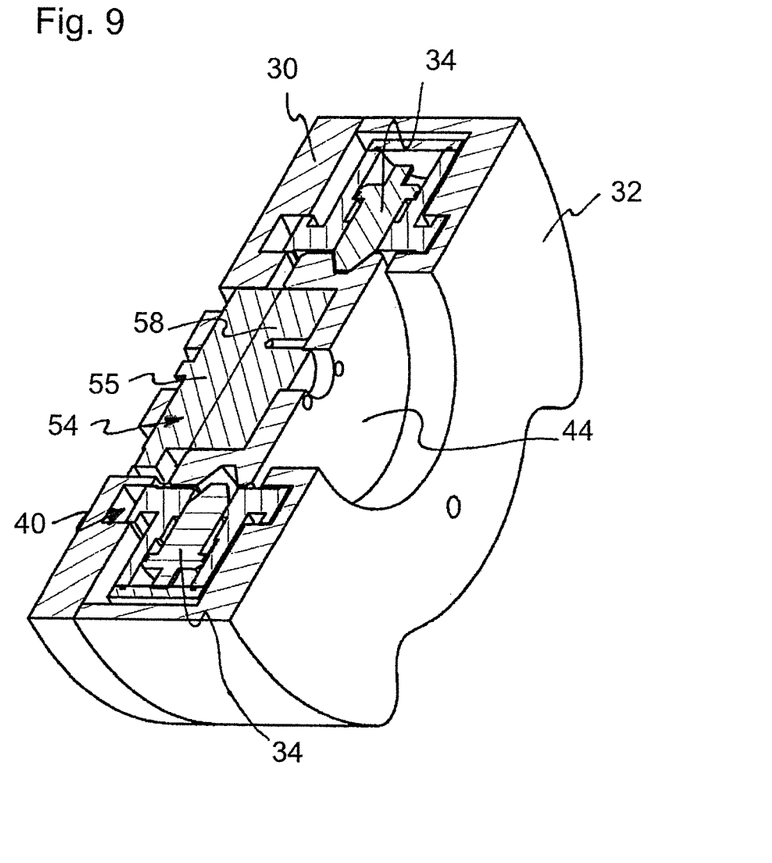
FIG. 9 is a perspective sectional of the compressor assembly of FIG. 7.
Figure 10:
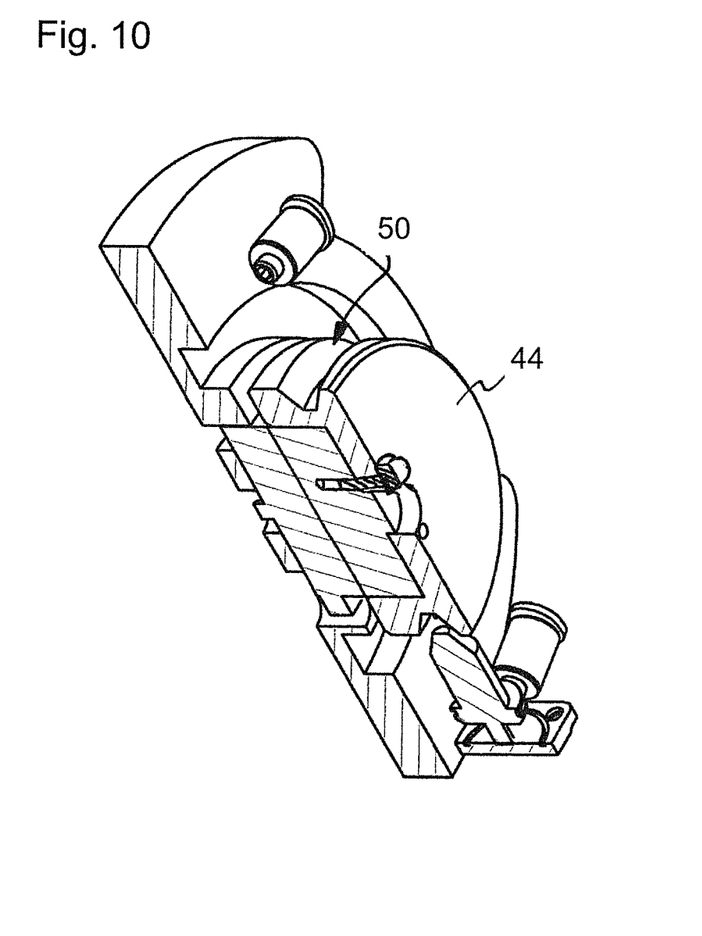
FIG. 10 is a perspective partial sectional of the compressor assembly of FIG. 8.

When the transmission component-side pressure chamber 72 is no longer subjected to the pressure medium, the hub-side transmission components 34 return to their untensioned positions, as is shown by the lower of the two hub-side transmission components 34, because they are each pretensioned in this position by a compression spring 74.

The upper hub-side transmission component 34 shown in FIG. 8 is engaged with the drive-side transmission component 44, and interacts therewith.

In order to be brought into engagement with the drive-side transmission component 44, the hub-side transmission components 34 move radially 76 to the drive-side transmission component 44. The hub-side transmission components 34 have a cross section at their ends 78 facing the drive-side transmission component at their engagement sections 48, the extension of which broadens radially.

The cam track 50 has two curved surfaces, wherein both curved surfaces extend radially toward the axis of rotation. In other words, the curved surfaces 80 do not run precisely in the radial direction 76 in the cutaway view in FIG. 8, i.e. in a cut along the radial direction 76. In other words, the bore of the cam track 50 rises radially outward. As a result of the roughly inclined shape of the cam track 52 described above, and the engagement section 48 of the hub-side transmission component 34, it is possible to smoothly couple and decouple the hub-side transmission components 34 in the drive-side transmission component 44.

If the hub-side transmission components 34 are coupled in the drive-side transmission component 44, the compressor assembly 10 is operated as described in reference to the embodiment in FIGS. 3 to 6.

The operation can be induced by decoupling the transmission components 34, 44, or by interrupting the operation of the electric drive 54, such that the compressor assembly 10 is switched from a functional operating state to a freewheeling operating state.

Figure 11:
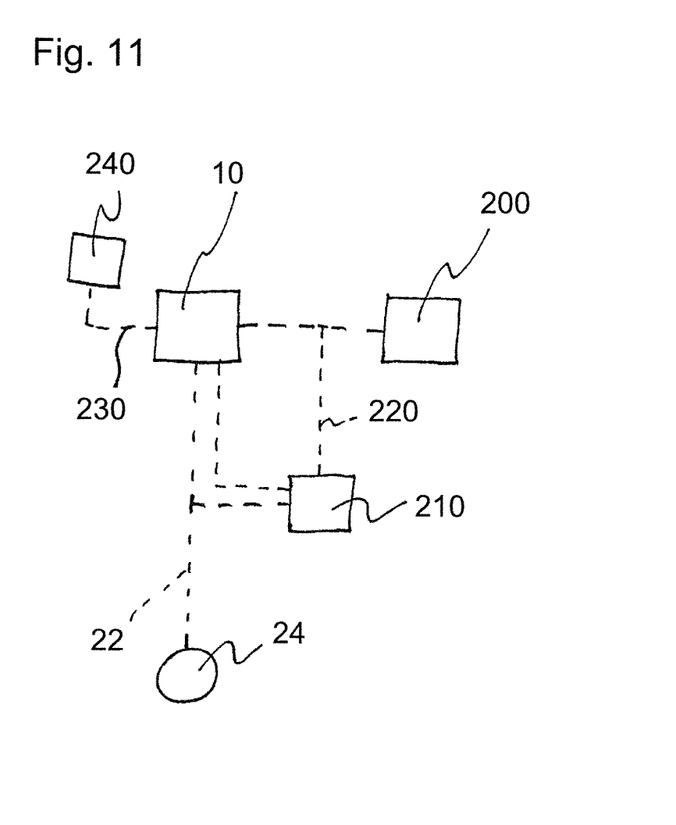
FIG. 11 is a schematic illustration of an embodiment of a compressor assembly with a filter according to one embodiment of this invention.

As FIG. 11 shows, the compressor assembly 10 can be connected to a filter 200 and a control mechanism 210. The filter 200 is preferably located where it establishes a fluid connection in front of the pressure medium intakes or air intakes of the compressor assembly 10.

The control mechanism 210 can detect when the filter 200 is clogged via a measurement connection 220. If the control mechanism detects that the filter 200 is clogged, the filter can be cleaned in that it is subjected to a pressure medium, or air, in the other direction. In the normal operation of the compressor assembly 10, air is conveyed through the filter 200 toward the compressor assembly 10, and from there to the tire cavity 24. In a cleaning procedure, a pressure medium, or air, is either let out of the tire cavity 24, and conveyed through the filter 200 in the other direction, or the compressor assembly 10 conveys a pressure medium toward the filter 200, instead of the tire cavity 24. For this, the compressor assembly 10 suctions in the pressure medium in via an additional intake 230, which has an additional air filter 240 that can be cleaned in a similar manner.

Advantageously, the control mechanism 210 can be used to measure and/or indicate the pressure, temperature, and/or moisture of pressure medium in the tire cavity 24, wherein these functions are independent of the other functions of the control mechanism 210.

The invention claimed is:

1. A vehicle that has a compressor assembly (10) for supplying a pressure medium to a tire cavity (24) of a tire on a vehicle wheel (2), wherein the vehicle wheel (2) comprises a wheel hub mount (26) and is mounted on a wheel hub (18), wherein the wheel hub (18) can be mounted on a wheel mount (16) such that the wheel hub (18) can rotate about an axis of rotation (29), wherein the compressor assembly (10) is located at or in the wheel hub mount (26) and includes an electric drive (54), and further comprising a transmission assembly (45) configured to convert a rotating movement of the electric drive (54) into a translatory movement of a compressor component (38), wherein the transmission assembly (45) comprises a cam mechanism.

2. The vehicle that has the compressor assembly (10) according to claim 1, wherein the compressor assembly (10) comprises at least one compression chamber (40, 42) connected to the wheel hub (18) for conjoint rotation therewith.

3. The vehicle that has the compressor assembly (10) according to claim 2, wherein a volume of the compression chamber (40, 42) is altered by a translatory movement (62) of the compressor component (38), wherein the pressure medium conducted into the tire cavity (24) is pressurized by a reduction in the volume of the compression chamber (40, 42).

4. The vehicle that has the compressor assembly (10) according to claim 1, wherein the compressor component (38) executes an oscillating translatory movement (62) in a direction of the axis of rotation (29) when the compressor assembly (10) is in operation.

5. The vehicle that has the compressor assembly (10) according to claim 1, wherein the compressor component (38) executes an oscillating translatory movement (62) in a radial direction (76) when the compressor assembly (10) is in operation.

6. The vehicle that has the compressor assembly (10) according to claim 1, wherein the electric drive (54) is supplied by an on-board power source (3), and sliding contacts (4) transfer electric energy from the wheel mount to the wheel hub.

7. The vehicle that has the compressor assembly (10) according to claim 1, further comprising an electric energy source (5, 7, 8) on the wheel hub.

8. The vehicle that has the compressor assembly (10) according to claim 7, further comprising a generator (5, 8) at the wheel hub, which converts relative rotational movement (60) between the wheel hub and wheel mount components into electric energy for driving the compressor assembly (10).

9. The vehicle that has the compressor assembly (10) according to claim 1, further comprising a coupling mechanism (70) configured to couple a first transmission component (34) connected to the compressor component (38) with a second transmission component (44) connected to the electric drive (54).

10. A compressor assembly (10) according to claim 1, further comprising a filter (200) at a pressure medium intake end.

11. The compressor assembly (10) according to claim 1, wherein the pressure medium, from the tire cavity (24) or by conveying the pressure medium through the compressor assembly (10), cleans the filter (200).

\* \* \* \* \*